United States Patent
Tornbaum et al.

(10) Patent No.: US 11,274,920 B1
(45) Date of Patent: Mar. 15, 2022

(54) SYSTEMS AND METHODS FOR MEASURING ANGULAR MISALIGNMENT BETWEEN MARINE PROPULSION DEVICES

(71) Applicant: Brunswick Corporation, Mettawa, IL (US)

(72) Inventors: Andres Perdomo Tornbaum, Neenah, WI (US); Michael S. Makus, Oshkosh, WI (US); Brad E. Taylor, Dallas, TX (US); Michael R. Schlichting, Omro, WI (US)

(73) Assignee: Brunswick Corporation, Mettawa, IL (US)

( * ) Notice: Subject to any disclaimer, the term of this patent is extended or adjusted under 35 U.S.C. 154(b) by 150 days.

(21) Appl. No.: 16/917,119

(22) Filed: Jun. 30, 2020

(51) Int. Cl.
| | | |
|---|---|---|
| *B63H 20/08* | (2006.01) | |
| *G01B 11/27* | (2006.01) | |
| *B63H 20/00* | (2006.01) | |

(52) U.S. Cl.
CPC ........... *G01B 11/272* (2013.01); *B63H 20/08* (2013.01); *B63H 2020/003* (2013.01); *B63H 2020/008* (2013.01)

(58) Field of Classification Search
CPC G01B 11/272; B63H 20/08; B63H 2020/003; B63H 2020/008
See application file for complete search history.

(56) References Cited

U.S. PATENT DOCUMENTS

| | | | |
|---|---|---|---|
| 4,684,248 A | * | 8/1987 | Cinzori ............... G01B 11/272 356/141.3 |
| 5,987,762 A | | 11/1999 | Toth et al. |
| 6,183,321 B1 | | 2/2001 | Alby et al. |
| 6,374,507 B1 | | 4/2002 | Lehto |
| 6,419,534 B1 | | 7/2002 | Helsel et al. |
| 6,434,841 B1 | | 8/2002 | Stahl et al. |
| 7,207,854 B1 | | 4/2007 | Anderson, Jr. et al. |
| 7,267,068 B2 | | 9/2007 | Bradley et al. |
| 8,046,122 B1 | | 10/2011 | Barta et al. |
| 9,207,071 B2 | | 12/2015 | Diefenderfer |

(Continued)

OTHER PUBLICATIONS

STR XACT Laser Height Tool. Outboard Mafia. Accessed at https://outboardmafia.com/products/str-xact-laser-height-tool on Mar. 6, 2020.

*Primary Examiner* — Stephen P Avila
(74) *Attorney, Agent, or Firm* — Andrus Intellectual Property Law, LLP (57) ABSTRACT

A system for measuring angular misalignment between marine propulsion devices. The system includes first and second members with mounting ends and distal ends. Attachment features are positioned at the mounting ends to attach the members to first and second propulsion shafts of the marine propulsion devices. Emitters configured to emit light are coupled to the first and second members. When the first and second member are attached to the propulsion shafts, a first emitter emits the light towards a target on the second member and a second emitter emits the light towards a target on the first member. The angular misalignment between the propulsion shafts is measurable based on a first offset between the target and where the light from the first emitter shines on the second member, and based on a second offset between the target and where the light from the second emitter shines on the first member.

20 Claims, 8 Drawing Sheets

(56) References Cited

U.S. PATENT DOCUMENTS

| | | | |
|---|---|---|---|
| 9,285,215 B2 | 3/2016 | Olszewski | |
| 9,869,546 B2 | 1/2018 | Donovan | |
| 9,932,098 B1 | 4/2018 | Andrasko et al. | |
| 2004/0252302 A1* | 12/2004 | Henry | G01B 11/272 356/400 |
| 2005/0052640 A1* | 3/2005 | Loen | G01B 11/272 356/152.1 |
| 2015/0176984 A1 | 6/2015 | Donovan | |

* cited by examiner

SYSTEMS AND METHODS FOR MEASURING ANGULAR MISALIGNMENT BETWEEN MARINE PROPULSION DEVICES

FIELD

The present disclosure generally relates to systems and methods for measuring angular misalignment between marine propulsion devices, and more particularly to systems and methods for measuring angular misalignment between propulsion shafts for marine propulsion devices.

BACKGROUND

The following U.S. patents and patent applications provide background information and are incorporated by reference in entirety.

U.S. Pat. No. 6,183,321 discloses an outboard motor comprising a pedestal that is attached to a transom of a boat, a motor support platform that is attached to the outboard motor, and a steering mechanism that is attached to both the pedestal and the motor support platform. It comprises a hydraulic tilting mechanism that is attached to the motor support platform and to the outboard motor. The outboard motor is rotatable about a tilt axis relative to both the pedestal and the motor support platform. A hydraulic pump is connected in fluid communication with the hydraulic tilting mechanism to provide pressurized fluid to cause the outboard motor to rotate about its tilting axis. An electric motor is connected in torque transmitting relation with the hydraulic pump. Both the electric motor and the hydraulic pump are disposed within the steering mechanism.

U.S. Pat. No. 6,419,534 discloses a support system for an outboard motor which uses four connectors attached to a support structure and to an engine system for isolating vibration from being transmitted to the marine vessel to which the outboard is attached. Each connector comprises an elastomeric portion for the purpose of isolating the vibration. Furthermore, the four connectors are disposed in a common plane which is generally perpendicular to a central axis of a driveshaft of the outboard motor. Although precise perpendicularity with the driveshaft axis is not required, it has been determined that if the plane extending through the connectors is within forty-five degrees of perpendicularity with the driveshaft axis, improved vibration isolation can be achieved. A support structure, or support saddle, completely surrounds the engine system in the plane of the connectors. All of the support of the outboard motor is provided by the connectors within the plane, with no additional support provided at a lower position on the outboard motor driveshaft housing.

U.S. Pat. No. 7,207,854 discloses a tie bar arrangement, which uses a rod end cartridge assembly that provides relative rotatability between an associated rod end and a coupler tube. The provision of a connecting link and steering arm adapter associated with the rod end cartridge assembly also provides relative rotation about first and second axes which allow sufficient flexibility to avoid placing the tie bar arrangement under excessive stress when one marine propulsion device is tilted relative to another marine propulsion device.

U.S. Pat. No. 7,267,068 discloses a marine vessel which is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 8,046,122 discloses a control system for a hydraulic steering cylinder which utilizes a supply valve and a drain valve. The supply valve is configured to supply pressurized hydraulic fluid from a pump to either of two cavities defined by the position of a piston within the hydraulic cylinder. A drain valve is configured to control the flow of hydraulic fluid away from the cavities within the hydraulic cylinder. The supply valve and the drain valve are both proportional valves in a preferred embodiment of the present invention in order to allow accurate and controlled movement of a steering device in response to movement of a steering wheel of a marine vessel.

U.S. Pat. No. 9,932,098 discloses systems and methods for reducing steering pressures of marine propulsion device steering actuators. First and second sensors sense first and second conditions of first and second steering actuators. A third sensor senses an operating characteristic of the marine vessel. A controller is in signal communication with the first, second, and third sensors. In response to the marine vessel travelling generally straight ahead, the controller determines a target toe angle between the first and second marine propulsion devices based on the operating characteristic. The controller commands the first and second steering actuators to position the first and second marine propulsion devices at the target toe angle. The controller thereafter gradually adapts the target toe angle between the first and second marine propulsion devices until the controller determines that an absolute difference between the first condition and the second condition reaches a calibrated value.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a system for measuring angular misalignment between first and second propulsion shafts of first and second marine propulsion devices. The system includes first and second members each having a mounting end and a distal end. First and second attachment features are positioned at the mounting ends of the first and second members, respectively, where the first and second attachment features are configured to engage with the first and second propulsion shafts to attach the first and second members thereto, respectively. First and second emitters are coupled to the first and second members, respectively, where the first and second emitters are each configured to emit light, and where when the first and second member are attached to the first and second propulsion shafts the first emitter emits the light towards the second member and the second emitter emits the light towards the first member. First and second targets are positioned on the first and second members. The angular misalignment between the first and second propulsion shafts is measurable based on a first offset between the first target and where the light from the first emitter shines on the second member, and based on a second offset between the second target and where the light from the second emitter shines on the first member.

Another embodiment generally relates to a method for measuring angular misalignment between first and second propulsion shafts of first and second marine propulsion devices. The method includes coupling first and second members to the first and second propulsion devices, respectively, and defining first and second targets on the first and second members that together indicate angular misalignment between the first and second propulsion devices. The method further includes emitting light from a first emitter coupled to the first member onto the second member, and emitting light from a second emitter coupled to the second member onto the first member. The method further includes identifying a first light position where the light from the first emitter shines on the second member and also a second light position where the light from the second emitter shines on the first member, and comparing the first light position and the second light position to the first and second targets, respectively, to determine the angular misalignment between the first and second propulsion shafts.

Another embodiment generally relates to a system for measuring angular misalignment between first and second propulsion shafts of first and second marine propulsion devices. The system includes first and second members each having a mounting end and a distal end opposite the mounting end. First and second attachment features are positioned at the mounting ends of the first and second members, respectively, where each of the first and second attachment features is a clamp that includes a v-shaped portion and an opposing portion configured to together clamp onto one of the first and second propulsion shafts to attach the first and second members thereto. First and second emitters are coupled to the first and second members, respectively, where the first and second emitters are each lasers configured to emit light, and where when the first and second member are attached to the first and second propulsion shafts the first emitter emits the light towards the second member and the second emitter emits the light towards the first member. Scribe lines are provided with each of the first and second members, wherein the scribe lines extend parallel to each other, and also parallel to axes each extending between the mounting ends and the distal ends of the first and second members. A center line among the scribe lines for each of the first and second members is defined as a first target and as a second target, respectively, for the first and second members. The angular misalignment between the first and second propulsion shafts is measureable based on a first offset between the first target and where the light from the first emitter shines on the second member, and based on a second offset between the second target and where the light from the second emitter shines on the first member.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

The present disclosure generally relates to systems and methods for measuring angular misalignment between marine propulsion devices, and particularly the propulsion shafts thereof (e.g., propeller shafts). The inventors have recognized that currently known systems and methods for performing drive alignment (in other words, alignment of the propulsion shafts) require manual processes and techniques. These techniques are inaccurate, imprecise, inefficient, and contain multiple limitations that inhibit applications from multi-engine applications. In general, systems and methods presently known in the art require the use of an appropriately sized straight edge, such as a level, which generally must be at least four inches longer than the separation between the outermost drives of the marine vessel. In certain examples, these outmost drives may be 15 feet or more apart. As additional engines are positioned on the sterns of marine vessels, it becomes increasingly difficult to find a sufficiently long straight edge to ensure that the outermost engines are in alignment. This very long straight edge would then be cumbersome to use for aligning other engines that are positioned closer together (on the same vessel, even), thereby encouraging the need for straight edges of multiple sizes to perform all the alignments of a given marine vessel. In addition, the systems and methods presently known in the art are extremely difficult to use within the context of triple engines, which require finding two center points on two engines that are different lengths, without also calculating the hypotenuse of the triangle formed by the three engines.

Moreover, even when an appropriately sized straight edge is available, results of the manual process are highly subjective, leading to imprecise and inaccurate results. Additionally, current processes require at least two people to perform a manual drive alignment efficiently and accurately, which is only further exacerbated as the distance between the outermost drives increases. Finally, the process is very time-consuming and cumbersome to accomplish, further providing no tolerance for the final alignment results.

The inventors recognized that boats are now being outfitted with six or more outboard engines, exacerbating the problem by requiring substantial manual processing with a substantial drive distance between the outermost outboard engines. If done incorrectly, this drive alignment can have a negative effect on the overall performance of the marine vessel, inducing unnecessary wear and tear on the marine propulsion devices, the marine vessel, or other components due to higher working loads during operation.

In contrast, the inventors have identified that proper drive alignment, which results in proper parallelism between the propulsion shafts of multi-engine applications provide numerous benefits, including improved safety and handling of the marine vessel (e.g., stability), more efficient running and handling of the marine vessel (e.g., fuel economy), optimized performance for running and handling the marine vessel (e.g., speed and acceleration), compensation for hull and transom deficiencies, minimized acceleration of wear and tear on systems and/or components, and/or minimized power steering pump current consumption due to reduced steering loads by having even drive alignment. The improvements described herein are also critical to the future control of steer by wire systems, which necessitates having a known parallel state before digital steering commands can be made. For example, steer by wire may create intentional toe, which first requires knowing what is parallel.

Figure 1:
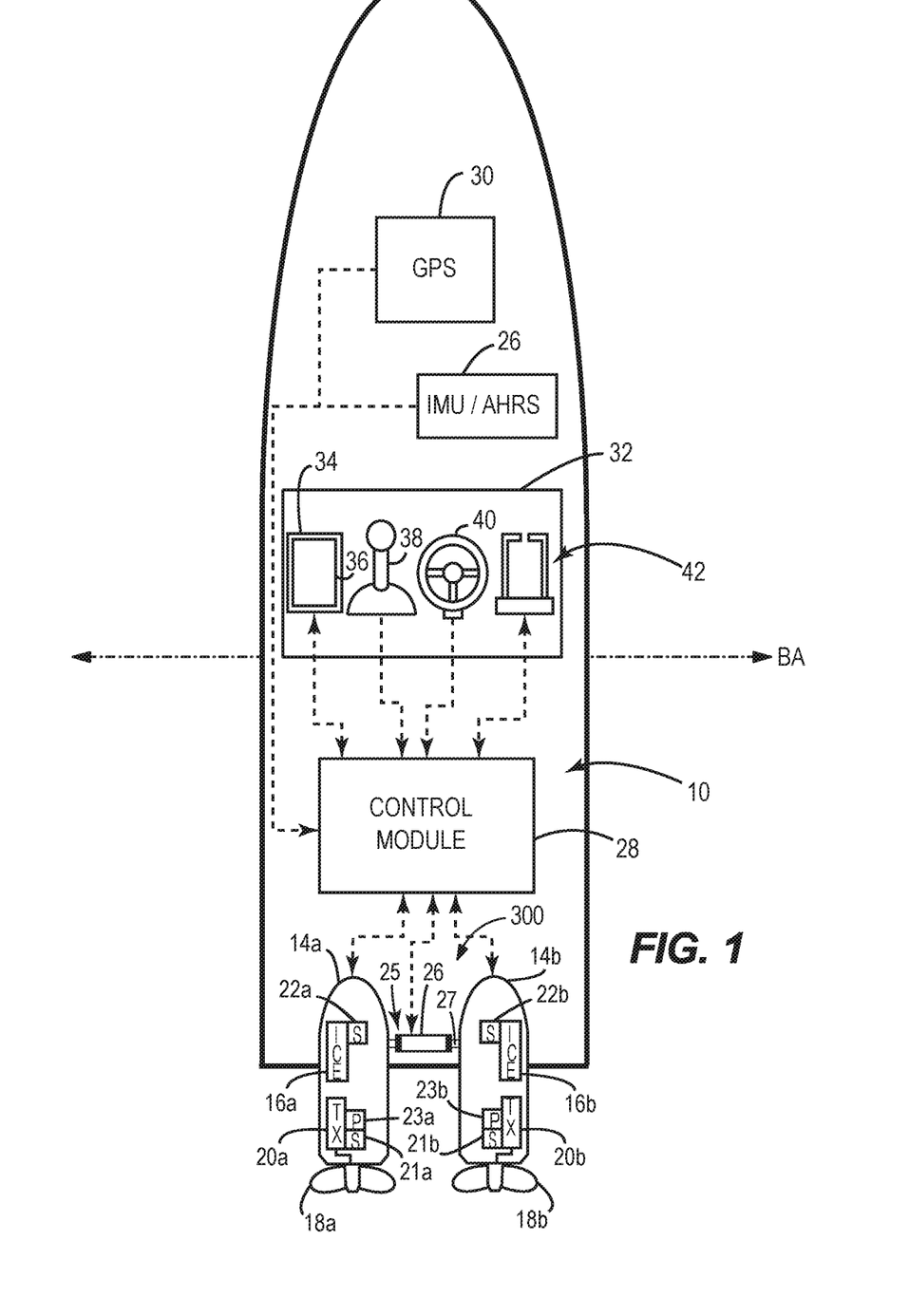
FIG. 1 is a top view of an exemplary marine vessel incorporating the systems and operable via the method presently disclosed.

FIG. 1 illustrates a marine propulsion system 10 for a marine vessel 12. The marine propulsion system 10 includes two marine propulsion devices 14a, 14b, but one or more than two marine propulsion devices could instead be provided. The marine propulsion devices 14a, 14b shown herein are outboard motors, but the marine propulsion devices could instead be inboard motors, stern drives, pod drives, jet drives, etc. Each marine propulsion device 14a, 14b includes an engine 16a or 16b. The engines 16a, 16b shown here are internal combustion engines, which may be, for example, gasoline or diesel engines. Each marine propulsion device 14a, 14b also includes a propeller 18a or 18b configured to be coupled in torque-transmitting relationship with a respective engine 16a or 16b. Such torque-transmitting relationship is more specifically provided by way of a transmission 20a or 20b configured to transmit torque from a respective engine 16a or 16b to a respective propeller 18a or 18b. Each transmission 20a, 20b is configured to transmit torque from the engine 16a or 16b to the propeller 18a or 18b at one of at least a first gear ratio and a second gear ratio, although additional gear ratios such as, for example, third, fourth, fifth, etc. gear ratios could be provided. Alternatively, only a single forward gear ratio may be provided.

The marine propulsion system 10 further includes engine speed sensors 22a, 22b measuring a speed of a respective engine 16a, 16b. In one example, the engine speed sensors 22a, 22b may be shaft rotational speed sensors (e.g., tachometers), which measure a speed of the engine 16a or 16b in rotations per minute (RPM), as is known to those having ordinary skill in the art. Each transmission 20a, 20b includes a transmission output speed (TOS) sensor 21a, 21b that measures an output speed of the respective transmission 20a, 20b in RPM. The TOS sensors 21a, 21b may be of a type similar to that of the engine speed sensors 22a, 22b. Clutch pressure sensors 23a, 23b are also provided in connection with the transmissions 20a, 20b. Clutch pressure sensors 23a, 23b can be pressure transducers in the hydraulic circuit(s) associated with the clutches of the transmissions 20a, 20b.

The marine propulsion system 10 also includes a control module 28 in signal communication with the engines 16a, 16b and the transmissions 20a, 20b, as well as their associated sensors and valves and other components noted herein below. The control module 28 is programmable and includes a processor and a memory. The control module 28 can be located anywhere in the marine propulsion system 10 and/or located remote from the marine propulsion system 10 and can communicate with various components of the marine vessel 12 via a peripheral interface and wired and/or wireless links, as will be explained further herein below. Although FIG. 1 shows one control module 28, the marine propulsion system 10 can include more than one control module. Portions of the method disclosed herein below can be carried out by a single control module or by several separate control modules. For example, the marine propulsion system 10 can have control modules located at or near a helm 32 of the marine vessel 12 and can also have control module(s) located at or near the marine propulsion devices 14a, 14b. If more than one control module is provided, each can control operation of a specific device or sub-system on the marine vessel.

In some examples, the control module 28 may include a computing system that includes a processing system, storage system, software, and input/output (I/O) interfaces for communicating with peripheral devices. The systems may be implemented in hardware and/or software that carries out a programmed set of instructions. As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The control module 28 communicates with one or more components of the marine propulsion system 10 via the I/O interfaces and a communication link, which can be a wired or wireless link. In one example, the communication link is a controller area network (CAN) bus, but other types of links could be used. It should be noted that the extent of connections of the communication link shown herein is for schematic purposes only, and the communication link in fact provides communication between the control module 28 and each of the peripheral devices noted herein, although not every connection is shown in the drawing for purposes of clarity.

Figure 8:
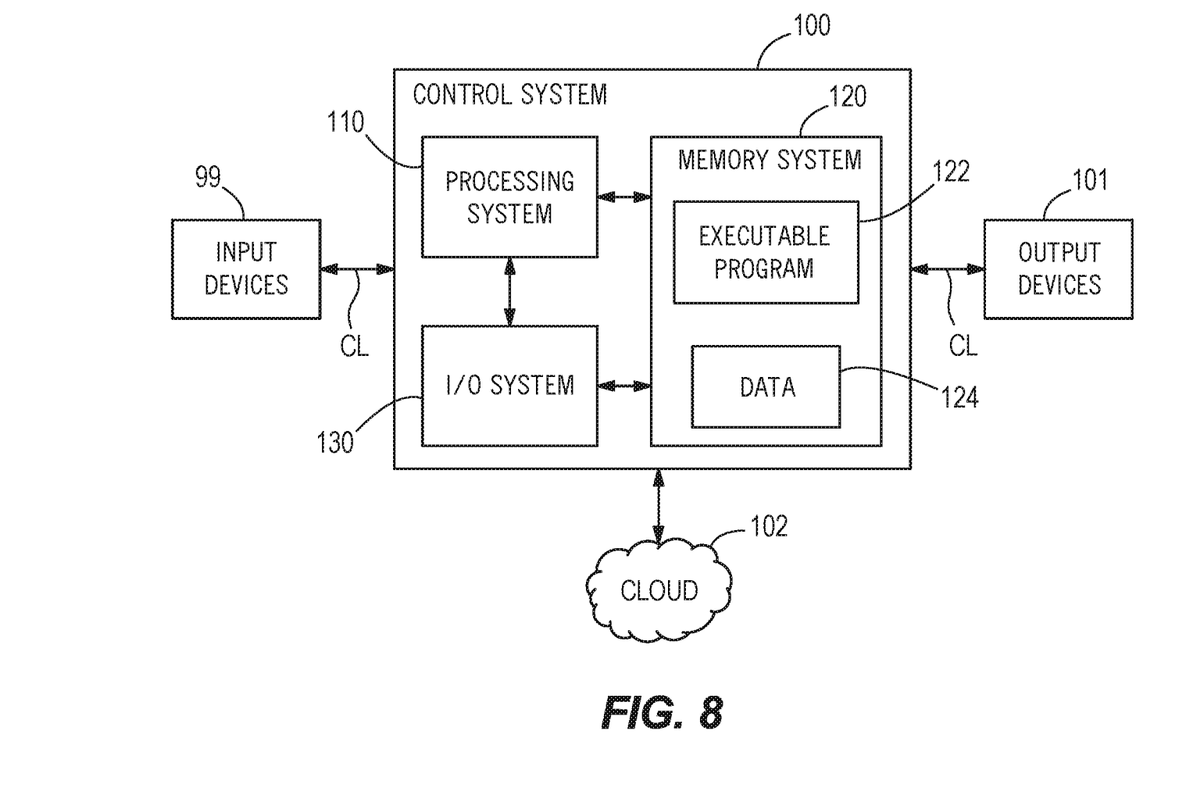
FIG. 8 depicts an exemplary control system as may be incorporated within one of the systems according to the present disclosure.

An exemplary control system 100 is shown in FIG. 8, which can be used as the control module 28 discussed above. Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 100 communicates with each of the one or more components of the marine propulsion system 10 via a communication link CL, which can be any wired or wireless link. The control system 100 is capable of receiving information and/or controlling one or more operational characteristics of the marine propulsion system 10 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the system 1. Moreover, the communication link CL lines are meant only to demonstrate that the various control elements are capable of communicating with one another, and do not represent actual wiring connections between the various elements, nor do they represent the only paths of communication between the elements. Additionally, the marine propulsion system 10 may incorporate various types of communication devices and systems, and thus the illustrated communication links CL may in fact represent various different types of wireless and/or wired data communication systems.

The control system 100 may be a computing system that includes a processing system 110, memory system 120, and input/output (I/O) system 130 for communicating with other devices, such as input devices 99 and output devices 101, either of which may also or alternatively be stored in a cloud 102. The processing system 110 loads and executes an executable program 122 from the memory system 120, accesses data 124 stored within the memory system 120, and directs the marine propulsion system 10 to operate as described in further detail below.

The processing system 110 may be implemented as a single microprocessor or other circuitry, or be distributed across multiple processing devices or sub-systems that cooperate to execute the executable program 122 from the memory system 120. Non-limiting examples of the processing system include general purpose central processing units, application specific processors, and logic devices.

The memory system 120 may comprise any storage media readable by the processing system 110 and capable of storing the executable program 122 and/or data 124. The memory system 120 may be implemented as a single storage device, or be distributed across multiple storage devices or sub-systems that cooperate to store computer readable instructions, data structures, program modules, or other data. The memory system 120 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Returning to FIG. 1, the marine propulsion system 10 also includes a global positioning system (GPS) 30 that provides location and speed of the marine vessel 12 to the control module 28. Additionally or alternatively, a vessel speed sensor such as a Pitot tube or a paddle wheel could be provided. The marine propulsion system 10 may also include an inertial measurement unit (IMU) or an attitude and heading reference system (AHRS) 26. An IMU has a solid state, rate gyro electronic compass that indicates the vessel heading and solid state accelerometers and angular rate sensors that sense the vessel's attitude and rate of turn. An AHRS provides 3D orientation of the marine vessel 12 by integrating gyroscopic measurements, accelerometer data, and magnetometer data. The IMU/AHRS could be GPS-enabled, in which case a separate GPS 30 would not be required.

Further, the marine propulsion system 10 includes a number of operator input devices located at the helm 32 of the marine vessel 12. The operator input devices include a multi-functional display device 34 including a user interface 36. The user interface 36 may be an interactive, touch-capable display screen, a keypad, a display screen and keypad combination, a track ball and display screen combination, or any other type of user interface known to those having ordinary skill in the art for communicating with a multi-functional display device 34. A joystick 38 is also provided at the helm 32 and allows an operator of the marine vessel 12 to command the marine vessel 12 to translate or rotate in any number of directions. A steering wheel 40 is provided for providing steering commands to the marine propulsion devices 14a, 14b or to a rudder, in the event that the marine propulsion devices are not steerable. A throttle lever 42 is also provided for providing thrust commands, including both a magnitude and a direction of thrust, to the control module 28. Here, two throttle levers are shown, each of which can be used to control one of the marine propulsion devices 14a or 14b, although the two levers can be controlled together as a single lever. Alternatively, a single lever could be provided for controlling both marine propulsion devices 14a, 14b.

Several of the operator input devices at the helm 32 can be used to input an operator demand on the engines 16a, 16b to the control module 28, including the user interface 36 of the multi-functional display device 34, the joystick 38, and the throttle lever 42. By way of example, a rotation of the throttle lever 42 in a forward direction away from its neutral, detent position could be interpreted as a value from 0% to 100% operator demand corresponding via an input/output map, such as a look up table, to a position of the throttle valves of the engines 16a, 16b. For example, the input/output map might dictate that the throttle valves are fully closed when the throttle lever 42 is in the forward, detent position (i.e., 0% demand), and are fully open when the throttle lever 42 is pushed forward to its furthest extent (i.e., 100% demand).

Figure 2A:
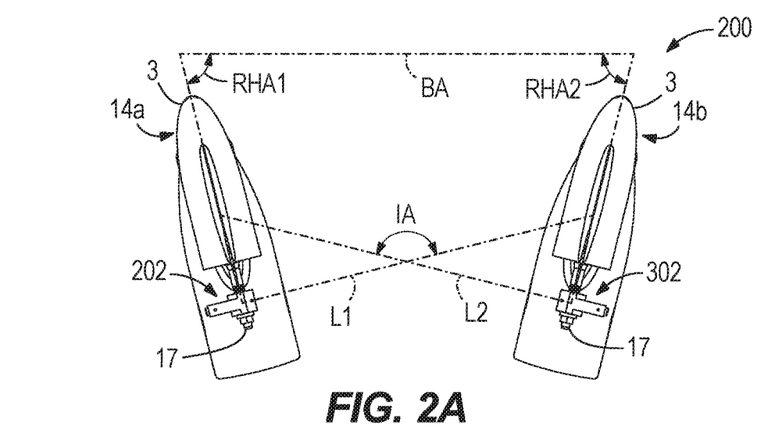
FIGS. 2A-2D depict two marine propulsion devices in differing states of angular alignment.
Figure 2B:
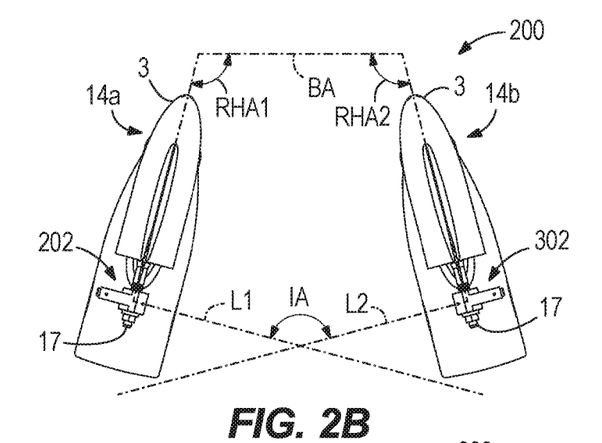

FIGS. 2A-2D generally depict two marine propulsion devices 14a, 14b in various states of alignment, in each case with the steering wheel 40 positioned in a straight-ahead orientation (or, in the case of a system using a tie-bar between the marine propulsion devices 14a, 14b, a centered tie-bar). Specifically, FIG. 2A depicts a configuration in which the nose cones 3 of the first and second marine propulsion devices 14a, 14b are each angled outwardly from the center of the marine vessel. In the example shown, the right hand angle RHA1 of the first marine propulsion device 14a is an acute angle less than 90°, whereas the right hand angle RHA2 of the second marine propulsion device 14b is an obtuse angle greater than 90°, each relative to the beam axis BA of the marine vessel 12 (FIG. 1). In contrast, FIG. 2B depicts both marine propulsion devices 14a, 14b angled inwardly such that the right hand angle RHA1 of the first marine propulsion device 14a is obtuse, whereas the right hand angle RHA2 of the second marine propulsion device 14b is acute.

Figure 2C:
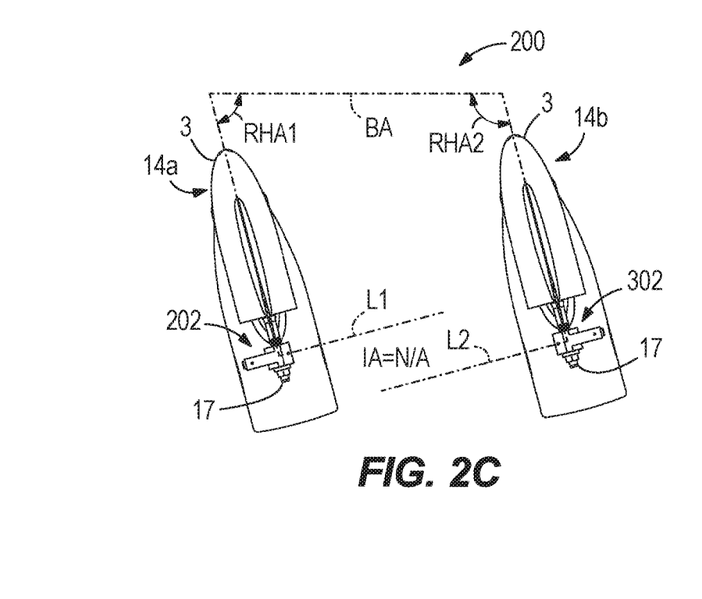

FIG. 2C depicts an orientation in which the marine propulsion devices 14a, 14b are generally aligned to be parallel to one another, but not properly aligned relative to the marine vessel 12. In this example, the right hand angle RHA1 of the first marine propulsion device 14a is equal to the right hand angle RHA2 of the second marine propulsion device 14b, each being acute relative to the beam axis BA. In other words, while the marine propulsion devices 14a, 14b generally provide for propulsion in the same direction with respect to one another, they would not provide for a purely forward/aft force for the marine vessel 12 in use. However, in general the systems and methods described herein provide for parallelism or a known amount of misalignment.

Figure 2D:
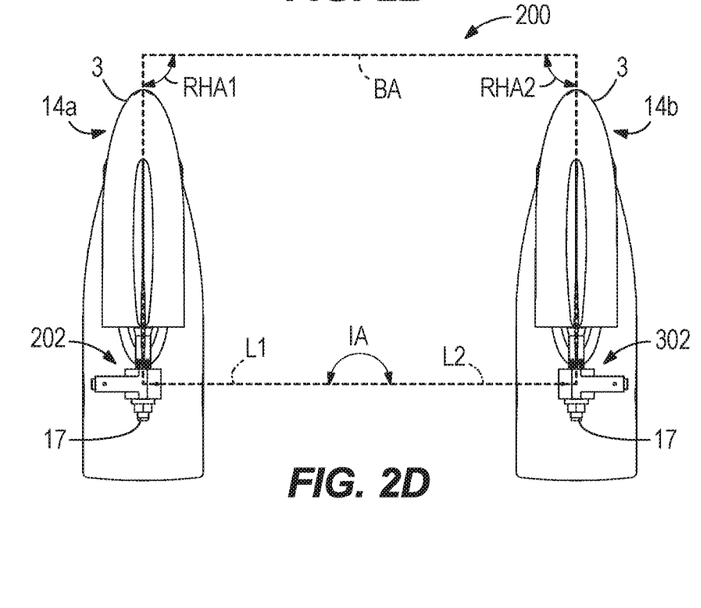

Finally, FIG. 2D depicts the marine propulsion devices 14a, 14b with proper angular alignment relative to one another, as well as relative to the marine vessel 12. In this case, the right hand angle RHA1 of the first marine propulsion device 14a is 90°, as is the right hand angle RHA2 of the second marine propulsion device 14b. As presently aligned, the marine propulsion devices 14a and 14b provide propulsive forces in the same direction, and also provide the advantages discussed above.

Figure 3:
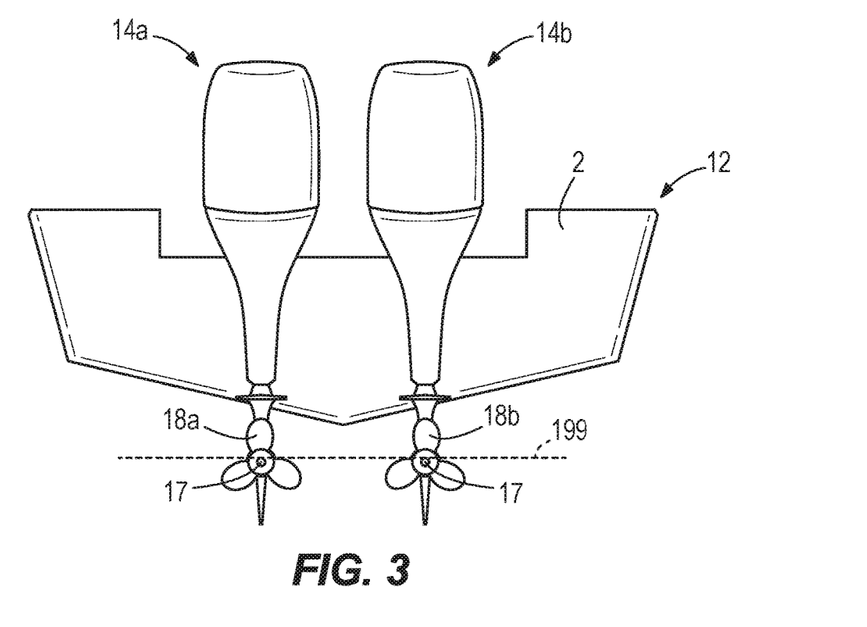
FIG. 3 depicts a rear view of an exemplary marine vessel having two marine propulsion devices requiring angular alignment.
Figure 4:
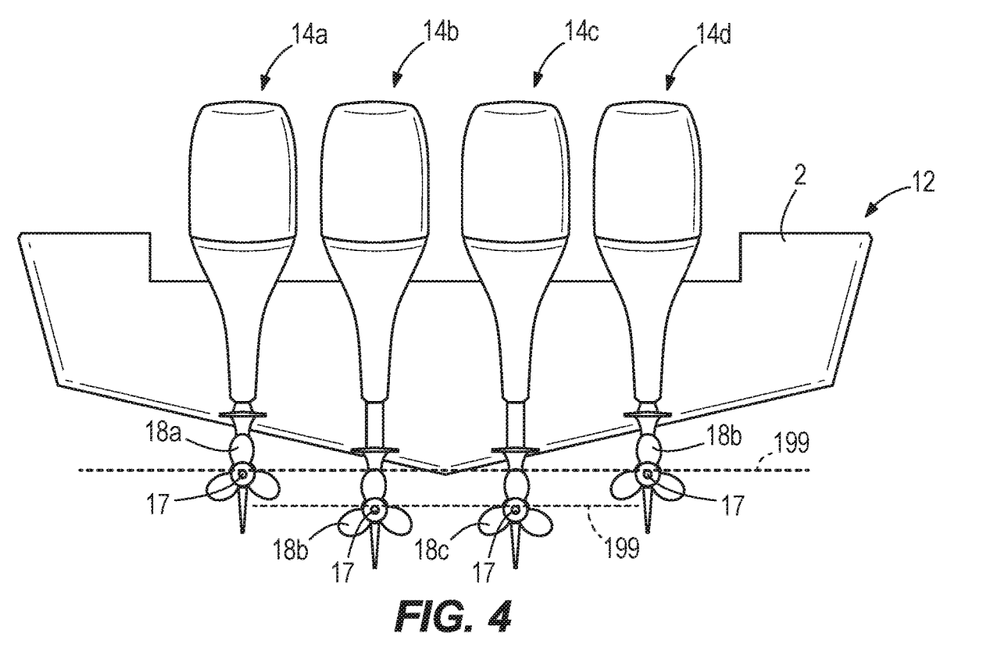
FIG. 4 depicts a rear view of an exemplary marine vessel having four marine propulsion devices requiring angular alignment.

FIGS. 3 and 4 depict rear views of exemplary marine vessels 12 with two and four marine propulsion devices mounted at the stern 2, respectively. As shown in FIG. 3, a straight edge 199 is placed on the propulsion shafts 17 of first and second marine propulsion devices 14a and 14b. To verify that the propulsion devices 14a and 14b are parallel, the straight edge must be flush against both gear cases. If an air gap is visible between the straight edge and either side of either gear case about the respective propulsion shafts 17, it is then concluded that the straight edge is not be flush against one or more of the gear cases.

FIG. 4 depicts another marine vessel 12, this time having four marine propulsion devices 14a, 14b, 14c, and 14d. The manual method presently known in the art for aligning four marine propulsion devices provides for first aligning the first and second marine propulsion devices 14a and 14b, which are the outermost marine propulsion devices in the present case, using the straight edge 199 as discussed above. The process is then repeated for the next innermost marine propulsion devices, in this case marine propulsion devices 14c and 14d, again using a straight edge 199, but as is shown, typically a different straight edge 199 than the straight edge 199 used for the first and second marine propulsion devices 14a and 14b.

The inventors have developed the presently disclosed systems and methods to simplify and standardize the process of measuring (and in certain examples, correcting) angular misalignment between marine propulsion devices. It will be recognized that in certain circumstances it is desirable for marine propulsion devices to have some degree of misalignment, which is sometimes referred to as intentionally creating "toe". However, it nonetheless remains critical to know this degree of misalignment to achieve the desired effect for the marine vessel. In view of this, the system discussed further below may include further scribe lines or other indications to enable creating this intentional toe. Returning to FIGS. 2A-2D, an exemplary system 200 according to the present disclosure is provided for each case of angular alignment previously discussed. As will be discussed further, the system 200 includes first and second devices fixed to the first and second marine propulsion devices 14a and 14b presently being aligned, which emit a light towards the opposite of the marine propulsion devices 14a and 14b. In the example shown, the first device 202 corresponding to the first marine propulsion device 14a emits a first light L1 towards the second marine propulsion device 14b, and the second device 302 mounted with the second marine propulsion device 14b emits a second light L2 towards the first marine propulsion device 14a. In the example of 14a, the first light L1 and second light L2 meet at an intersection angle IA that is not 180°, meaning that the marine propulsion devices 14a and 14b lack parallelism. The same can be seen in the orientation of FIG. 2B.

In contrast, the same system 200 shown in FIG. 2C provides for a first light L1 and second light L2 that are parallel to one another, but which do not intersect. Finally, FIG. 2D depicts an orientation in which the first light L1 and second light L2 are parallel, and also do intersect at an intersection angle IA of 180° (or in other words, lie within the same vertical plane extending out of the sheet).

Figure 5:
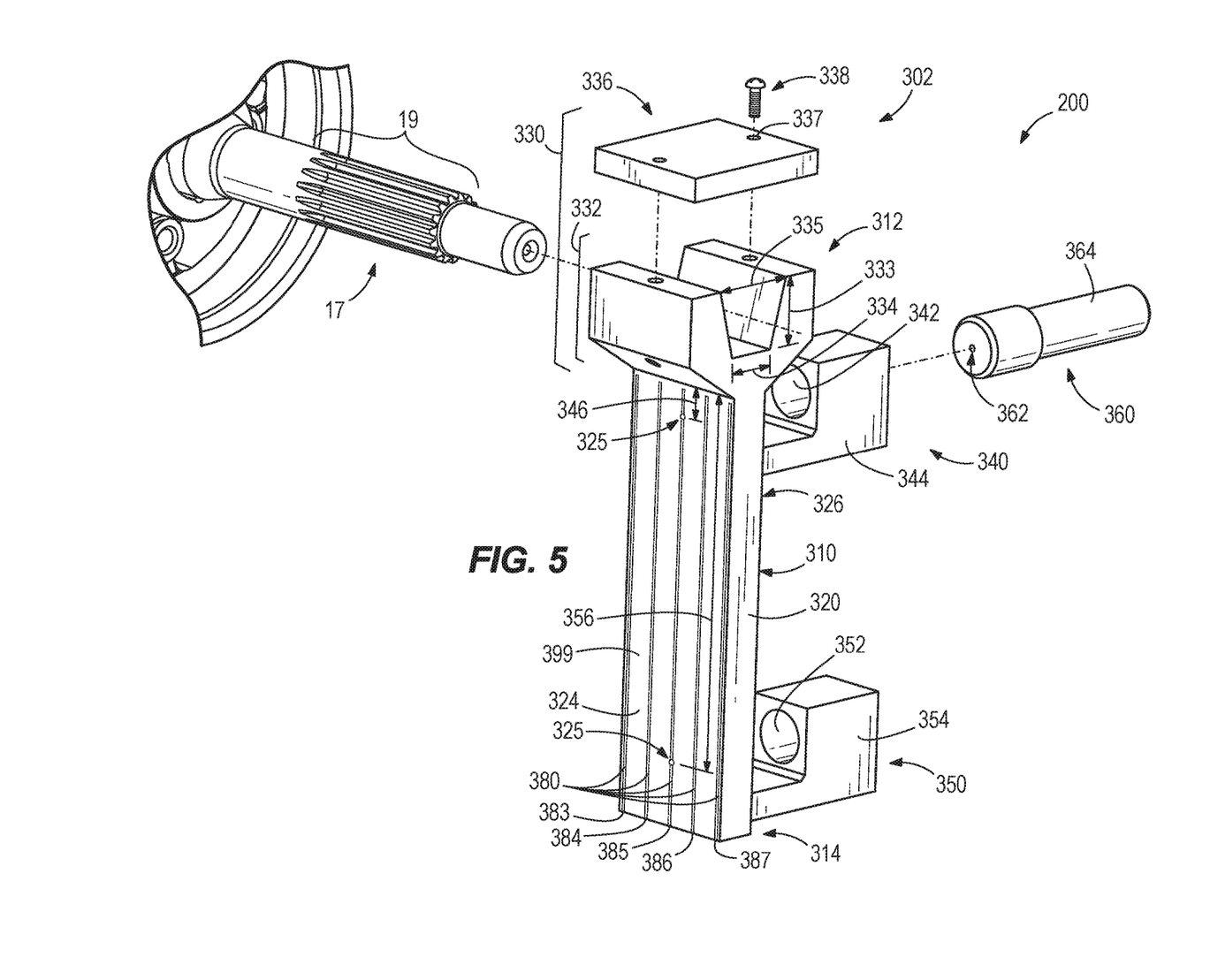
FIG. 5 is an isometric exploded view of an exemplary device used for measuring angular misalignment between marine propulsion devices according to the present disclosure.
Figure 6A:
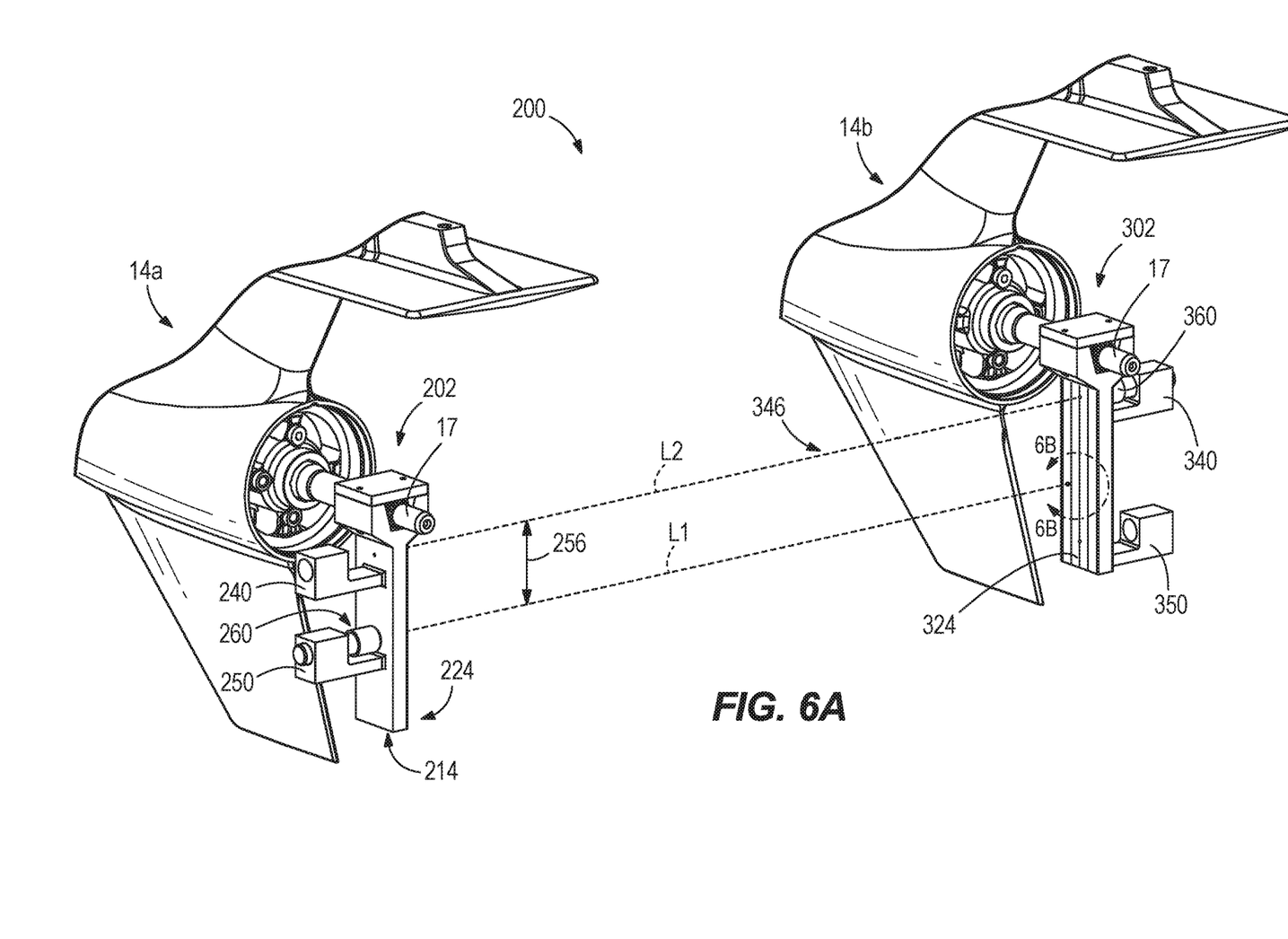
FIG. 6A is an isometric view depicting two devices for measuring angular misalignment between two marine propulsion devices according to the present disclosure.
Figure 6B:
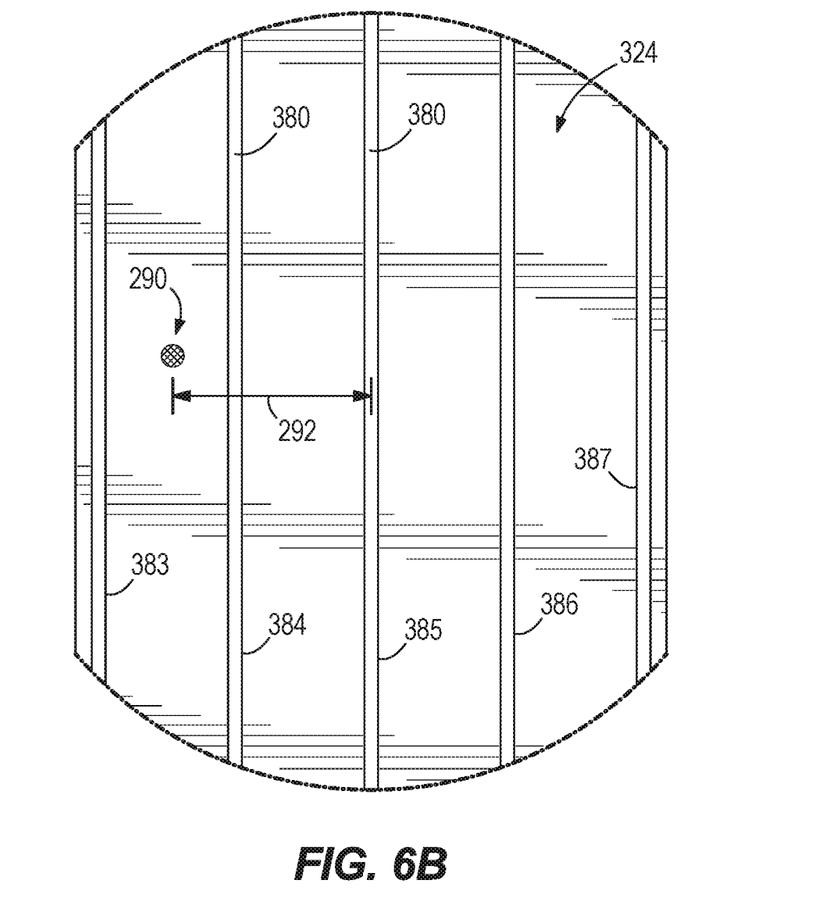
FIG. 6B is a close-up taken from FIG. 6A.

An exemplary system 200 as shown in FIGS. 2A-2D is shown in greater detail in FIGS. 5-6B. As discussed above, the system 200 provides for measuring angular misalignment between first and second propulsion shafts 17 corresponding to the first and second marine propulsion devices 14a, 14b. The system 200 includes a first device 202 and second device 302, which are similar in many ways but in some embodiments may have distinctions. These first devices 202 and second devices 302 have many features in common, which are now described for the second device 302 are shown in FIG. 5. The common features generally have reference numbers that differ by one hundred (e.g., fronts 224, 324).

The second device 302 includes a mounting end 312 and a distal end 314, which in the present embodiment is opposite the mounting end 312. The second member 310 has a front 324 and opposite back 326 extending between the mounting end 312 and the distal end 314, as do side edges 320. As will be become apparent, the front 324 of the second member 310 substantially forms a target area by which an emitter 260 associated with the first device 202 can shine a first light L1 thereon (specifically at a first light position 290, discussed below). A target, shown as centerline 385, is provided on the front 324 such that misalignment may be measured relative to the position in which the first light L1 shines on the front 324.

A second attachment feature 330 is positioned at the mounting end 312 of the second device 302, which is configured to engage with the second propulsion shaft 17 to attach the second member 310 thereto. In the example shown, the second attachment feature 330 has a first portion 332, which in the present example defines a V-shaped interior having a height 333, small width 334, and large width 335 configured to receive at least a portion of the propulsion shaft 17 therein. In this example, the first portion 332 is configured to receive the propulsion shaft 17 at a splined portion 19 thereof. A second portion 336 of the attachment feature 330 is configured to be coupled to the first portion 332 to retain the propulsion shaft 17 therein, in the present example together effectively forming a clamp. The second portion 336 defines openings 337 therein, which allows the second portion 336 to be removably coupled to the first portion 332 via fasteners 338 extending therethrough.

Other configurations are also anticipated by the second attachment 330, such as a sleeve or spline, for example. Essentially, the second attachment feature may be any device that permits the propeller shaft to support the emitters 360 in a stable and accurate manner.

An upper emitter mount 340 and lower emitter mount 350 are coupled to or otherwise positioned at the back 326 of the second member 310. The upper emitter mount 340 has a housing 344 that defines a receiver 342, whereby the receiver 342 is configured to receive an emitter 360. In certain examples, the emitter 360 is a laser, which may be battery-operated for simplicity and wireless mobility. In this manner, light from the second emitter 360 shines through the front 324 of the second device 310, particularly via an emission opening 325 defined therethrough, at an upper distance 346 from the attachment feature 330. Similarly, the lower emitter mount 350 has a housing 354 defining a receiver 352 configured to receive another emitter 360 therein, which would subsequently emit light through an emission opening 325 in the front 324 of the second device 302 at a lower distance 356 to the attachment feature 330.

As will become apparent, in certain methods for using the presently disclosed system 200 an emitter 360 may be positioned in only one of the upper emitter mount 340 or the lower emitter mount 350, or emitters 360 may be positioned within each. For example, the configuration shown in FIG. 6A provides for a first device 202 with an emitter 260 retained only within the lower emitter mount 250, and a second device 302 with an emitter 360 retained only within its upper emitter mount 340.

In certain embodiments, such as that shown in FIG. 6A, the first device 202 and second device 302 are configured to have emission openings for emitting light through the fronts 224, 334 at different upper distances 246, 346 from the attachment feature 230, 330, and/or at different lower distances 256, 356 from the attachment features 230, 330. This enables the same pair of first and second devices 202, 302 to be used for the alignment of propulsion shafts 17 positioned at different heights, such as aligning the first marine propulsion device 14a of FIG. 4 to the third marine propulsion device 14c, for example. In such cases, the emitters 260, 360 may be configured to be easily removable from the corresponding upper emitter mounts 240, 340 and lower emitter mounts 250, 350 (e.g., such as a press fit and a battery-operated emitter 260, 360) to reposition the emitters 260, 360 as needed.

Returning to FIG. 5, the fronts 224 and 324 of the first and second devices 202, 302 are provided with targets 285, 385, whereby light from the emitters 260, 360 would shine on both of the targets 285, 385 when the marine propulsion devices 14a, 14b are in perfect alignment, or at least within an allowable tolerance thereof. In the embodiment shown, the fronts 224, 324 are provided with scribe lines 380 defined therein. In this example, the center of the lines (also referred to as the center line) is defined as the target 385. Additional scribe lines 380 are provided as first lines 384, and 386 that are a single line away from the target 385, as well as second lines 383, and 387 that are two scribe lines 380 away from the target 385. In general, the additional scribe lines 380 are positioned outside the center line (target 385) at a spacing that creates an understanding of the degrees of misalignment for the marine propulsion devices 14a, 14b. Since the distance between the marine propulsion devices 14a, 14b impacts how far the emitter 380 will shine relative to the target 385 a given degree of misalignment, one or more tables may be provided (for example within the data 124 stored in the memory device 120) to provide this translation to misalignment. Therefore, actual degrees of misalignment may be printed with the scribe lines 380 in certain embodiments (e.g., dedicated for certain spacing configurations), but not in others (e.g., usable across many marine vessel configurations). As shown in the close-up of FIG. 6B, the example of FIG. 6A provides for the first light L1 emitted from the emitter 260 of the first device 202 shines on the front 324 of the second device 302 at a first light position 290. The angular misalignment between the first and second propulsion shafts 17 is then measurable based on a first offset 292 that is the distance between the first light position 290 and the target 385, as well as a corresponding second offset between a second light position from the emitter 360 shining on the first device 202 from the corresponding target 285 thereon.

In certain examples, the first light L1 and second light L2 shining on the corresponding targets 385 (and another, unlabeled on the first member 202) correspond to an angular misalignment that is within +/−0.3° for every 26 inches of separation between the first and second marine propulsion devices 14a and 14b. The positions of the scribe lines 380 may then be provided such that each additional line away from the targets 385 correspond to an additional set number of degrees of angular misalignment for each 26 inches of separation, for example. In this manner, an operator may use the first offset 292 and second offset (not labeled) to make corresponding adjustments to the positions of the first and/or second marine propulsion devices 14a, 14b.

In certain embodiments, an adjustment system 300 (FIG. 1) is coupled to at least one of the first and second marine propulsion devices 14a, 14b to adjust the angular misalignment therebetween. In the example of FIG. 1, the adjustment system 300 includes an actuator 25, which in the present example is a cylinder 26 with a rod 27 extending and retracting therefrom. The actuator 25 is coupled to one or both of the marine propulsion devices 14a, 14b in a manner known in the art, whereby extension of the rod 27 has an effect on the angular misalignment of the first and second marine propulsion devices 14a, 14b (for example extension bringing the nose cones 3 inwardly, and retraction outwardly, or the opposite). The adjustment system 300 may be optimized such that a known angular misalignment as determined by the first and second offsets 292, 392 correspond to a certain measured adjustment of the adjustment system 300. For example, in circumstances in which the actuator 25 is a threaded rod-based configuration, each degree of misalignment may correspond to one rotation of the threaded rod for the adjustment system 300, for example.

In further embodiments, a first detector (not separately labeled) and a second detector 399 are provided with the first and second devices 202, 302 to automatically detect the first light position 290 and second light position (not separately labeled) corresponding to the emitters 260, 360. For example, the fronts 224, 324 of the first and second members 210, 310 may have embedded light sensors, or an optical device such as a camera may be positioned on the opposing first and second device 202, 302, and/or mounted on the stern 2 of the marine vessel 12 to detect the first light position 290 and second light position (not separately labeled), for example. In such cases, a control system 100 (FIG. 8) may further be provided within the system 200, which is operatively coupled to the first and second detectors 399 to automatically determine the angular misalignment between the first and second marine propulsion devices 14a, 14b based on the outputs of the first and second detectors 399. In further embodiments, the control system 100 may further be operatively coupled to the adjustment system 300, such as with an electronic actuation system, whereby the control system 100 is then further configured to control the adjustment system 300 to automatically adjust the positions of the first and second marine propulsion devices 14a, 14b until no angular misalignment remains, or until the misalignment is at least within permissible tolerance.

Figure 7:
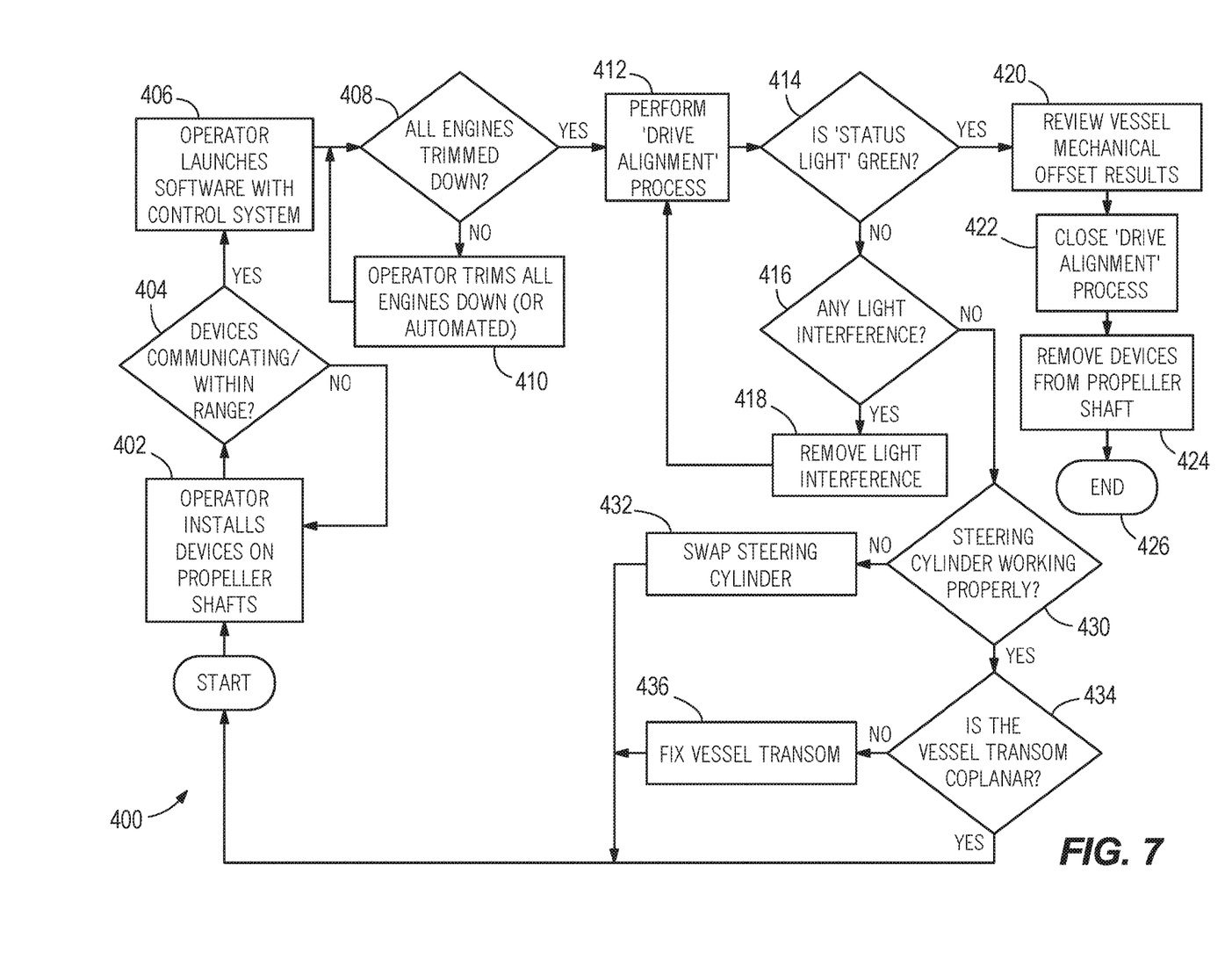
FIG. 7 is an exemplary method for measuring and correcting angular misalignment between marine propulsion devices using the systems and methods according to the present disclosure.

FIG. 7 depicts an exemplary method 400 for correcting angular misalignment using the systems and methods presently disclosed. Step 402 provides for the operator installing the first and second devices 202, 302 on the propulsion shafts 17 to be measured and aligned, for example using the systems and methods previously discussed. It is then determined in step 404 whether the first and second devices 202, 302, in the present example acting as wireless devices, are within communicating range. If not, the operator returns to step 402 or otherwise troubleshoots to get the first and second devices 202, 302 online. The operator then in step 406 launches software within the control system 100 that can make measurements and adjustments automatically, but also provide the necessary guidance for the operator up front. In step 408, the method determines whether all engines have been fully trimmed down in step 408. If not, which may be determined automatically or in the form of questions to the operator, the operator is instructed to trim all engines down in step 410 or the process may be automated in systems equipped with such functionality.

The process continues with step 412, which performs the drive alignment process in a manner such as was previously described. If it is determined in step 414 that the process has completed successfully, meaning a status light that is green and indicates the marine propulsion devices 14a, 14b being within an acceptable tolerance, the results of the first and second offsets 292, 392 are provided to the operator for review in step 420, and the drive alignment process is closed in step 422. The first and second devices 202, 302 may then be removed in step 424 from the propulsion shafts 17 and the process ends in step 426, with the first and second marine propulsion devices 14a, 14b now being in an acceptable tolerance of alignments.

If instead the status light is now determined to be green in step 414, it is first determined in step 416 whether there is any light interference, meaning that the emitter 260 and/or the emitter 360 is now properly emitting the first light L1 or second light L2, respectively. If so, the operator is instructed to remove the light interference in step 418, which may require replacing one or more of the emitters 260, 360, ensuring proper installation of the first and second devices 202, 302, or other corrections necessary to ensure no issues with the light transmission. Once no light interference is determined to exist in step 416, yet the drive alignment process has not been able to resolve the angular misalignment preventing the status light from being green in step 214, the process continues to step 430, which determines whether the steering cylinder is working properly. If not, the operator is instructed to swap the steering cylinder in step 432 and the process is repeated back from the start. If instead it is determined that the steering cylinder is working properly in step 430, the process continues to step 434, which determines whether the vessel transom is coplanar, which may be determined via a conventional method presently known in the art. If not, the operator is instructed to fix the vessel transom 436 in a manner presently known in the art, and the process returns to the start. If the vessel transom is instead determined in step 434 to be coplanar, the process also returns to the start, in certain embodiments also indicating that the process 400 was unable to resolve the angular misalignment and that further processes are necessary.

Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 100 (FIG. 8) communicates with each of the one or more components of the system 200 via a communication link CL, which can be any wired or wireless link. The control system 100 is capable of receiving information and/or controlling one or more operational characteristics of the system 200 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the system 1. Moreover, the communication link CL lines are meant only to demonstrate that the various control elements are capable of communicating with one another, and do not represent actual wiring connections between the various elements, nor do they represent the only paths of communication between the elements. Additionally, the system 200 may incorporate various types of communication devices and systems, and thus the illustrated communication links CL may in fact represent various different types of wireless and/or wired data communication systems.

The control system 100 may be a computing system that includes a processing system 110, memory system 120, and input/output (I/O) system 130 for communicating with other devices, such as input devices 99 and output devices 101, either of which may also or alternatively be stored in a cloud 102. The processing system 110 loads and executes an executable program 122 from the memory system 120, accesses data 124 stored within the memory system 120, and directs the system 200 to operate as described in further detail below.

The processing system 110 may be implemented as a single microprocessor or other circuitry, or be distributed across multiple processing devices or sub-systems that cooperate to execute the executable program 122 from the memory system 120. Non-limiting examples of the processing system include general purpose central processing units, application specific processors, and logic devices.

The memory system 120 may comprise any storage media readable by the processing system 110 and capable of storing the executable program 122 and/or data 124. The memory system 120 may be implemented as a single storage device, or be distributed across multiple storage devices or sub-systems that cooperate to store computer readable instructions, data structures, program modules, or other data. The memory system 120 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for measuring angular misalignment between first and second propulsion shafts of first and second marine propulsion devices, the system comprising:
   first and second members each having a mounting end and a distal end;
   first and second attachment features positioned at the mounting ends of the first and second members, respectively, wherein the first and second attachment features are configured to engage with the first and second propulsion shafts to attach the first and second members thereto, respectively;
   first and second emitters coupled to the first and second members, respectively, wherein the first and second emitters are each configured to emit light, and wherein when the first and second member are attached to the first and second propulsion shafts the first emitter emits the light towards the second member and the second emitter emits the light towards the first member; and
   first and second targets positioned on the first and second members;
   wherein the angular misalignment between the first and second propulsion shafts is measurable based on a first offset between the first target and where the light from the first emitter shines on the second member, and based on a second offset between the second target and where the light from the second emitter shines on the first member.

2. The system according to claim 1, wherein the first and second emitters are lasers.

3. The system according to claim 1, wherein at least a portion of each of the first and second attachment features is integrally formed with the first and second members, respectively.

4. The system according to claim 1, wherein the first and second attachment features are clamps configured to clamp onto the first and second propulsion shafts, respectively.

5. The system according to claim 4, wherein each of the clamps includes a v-shaped portion and an opposing portion configured to together clamp onto one of the first and second propulsion shafts.

6. The system according to claim 1, wherein scribe lines are provided with each of the first and second members, and wherein the scribe lines indicate degrees of the angular misalignment between the first and second propulsion shafts depending on where the lights from the second and first emitters shine on the first and second members, respectively.

7. The system according to claim 6, wherein the first and second targets are center lines among the scribe lines for each of the first and second member, and wherein the light from the first emitter and the light from the second emitter both shining on the center lines corresponds to the angular misalignment being within ±0.3 degrees for every 26" of separation between the first and second marine propulsion devices.

8. The system according to claim 1, wherein the first and second members are configured to suspend downwardly and vertically from the first and second propulsion shafts, respectively.

9. The system according to claim 1, further comprising first and second detectors that detect where the light from the second emitter shines on the first member and where the light from the first emitter shines on the second member, respectively, and further comprising a control system operatively coupled to the first and second detectors, and configured to determine the angular misalignment based on the first and second detectors.

10. The system according to claim 9, further comprising an adjustment system coupled to at least one of the first and second marine propulsion devices to adjust the angular misalignment therebetween, wherein the control system is also operatively coupled to the adjustment system, and wherein the control system is further configured to control the adjustment system to automatically adjust the angular misalignment.

11. The system according to claim 1, wherein the first emitter is coupled a first distance from the mounting end of the first member, wherein the second emitter is coupled a second distance from the mounting end of the second member that is different than the first distance.

12. A method for measuring angular misalignment between first and second propulsion shafts of first and second marine propulsion devices, the method comprising:
   coupling first and second members to the first and second propulsion devices, respectively;
   defining first and second targets on the first and second members that together indicate angular misalignment between the first and second propulsion devices;
   emitting light from a first emitter coupled to the first member onto the second member, and emitting light from a second emitter coupled to the second member onto the first member;
   identifying a first light position where the light from the first emitter shines on the second member and also a second light position where the light from the second emitter shines on the first member; and
   comparing the first light position and the second light position to the first and second targets, respectively, to determine the angular misalignment between the first and second propulsion shafts.

13. The method according to claim 12, wherein the first and second emitters are lasers.

14. The method according to claim 12, wherein the first and second members are coupled to the first and second propulsion shafts via clamps, wherein each of the clamps includes a v-shaped portion and an opposing portion configured to together clamp onto one of the first and second propulsion shafts.

15. The method according to claim 12, further comprising providing scribe lines on each of the first and second members, wherein the scribe lines indicate degrees of the angular misalignment between the first and second propulsion shafts depending on the first light position and the second light position.

16. The method according to claim 15, wherein the first and second targets are center lines among the scribe lines for each of the first and second member, and wherein the first light position and the second light position both being on the center lines corresponds to the angular misalignment being within ±0.3 degrees for every 26" of separation between the first and second marine propulsion devices.

17. The method according to claim 12, further comprising providing first and second detectors that detect the first light position and the second light position, respectively, and further comprising operatively coupling a control system to the first and second detectors, wherein the control system is configured to determine the angular misalignment based on the first and second detectors.

18. The method according to claim 17, wherein an adjustment system is operatively coupled to at least one of the first and second marine propulsion devices to adjust the angular misalignment therebetween, and wherein the control system is also operatively coupled to the adjustment system, further comprising controlling with the control system the adjustment system to automatically adjust the angular misalignment.

19. The method according to claim 17, further comprising positioning the first emitter a first distance from the first propulsion shaft and positioning the second emitter a second distance from the second propulsion shaft that is different from the first distance.

20. A system for measuring angular misalignment between first and second propulsion shafts of first and second marine propulsion devices, the system comprising:
 first and second members each having a mounting end and a distal end opposite the mounting end;
 first and second attachment features positioned at the mounting ends of the first and second members, respectively, wherein each of the first and second attachment features is a clamp that includes a v-shaped portion and an opposing portion configured to together clamp onto one of the first and second propulsion shafts to attach the first and second members thereto;
 first and second emitters coupled to the first and second members, respectively, wherein the first and second emitters are each lasers configured to emit light, and wherein when the first and second member are attached to the first and second propulsion shafts the first emitter emits the light towards the second member and the second emitter emits the light towards the first member; and
 scribe lines provided with each of the first and second members, wherein the scribe lines extend parallel to each other, and also parallel to axes each extending between the mounting ends and the distal ends of the first and second members, wherein a center line among the scribe lines for each of the first and second members is defined as a first target and as a second target, respectively, for the first and second members;
 wherein the angular misalignment between the first and second propulsion shafts is measureable based on a first offset between the first target and where the light from the first emitter shines on the second member, and based on a second offset between the second target and where the light from the second emitter shines on the first member.

* * * * *